(12) United States Patent
Durham et al.

(10) Patent No.: US 12,151,541 B2
(45) Date of Patent: Nov. 26, 2024

(54) MULTI-PANEL REMOVABLE ROOF SYSTEM

(71) Applicant: Teijin Automotive Technologies, Inc., Auburn Hills, MI (US)

(72) Inventors: Patrick Durham, Auburn Hills, MI (US); Hugh Foran, Auburn Hills, MI (US)

(73) Assignee: Teijin Automotive Technologies, Inc., Auburn Hills, MI (US)

(*) Notice: Subject to any disclaimer, the term of this patent is extended or adjusted under 35 U.S.C. 154(b) by 187 days.

(21) Appl. No.: 17/791,594

(22) PCT Filed: Jan. 11, 2021

(86) PCT No.: PCT/US2021/012903
§ 371 (c)(1),
(2) Date: Jul. 8, 2022

(87) PCT Pub. No.: WO2021/142414
PCT Pub. Date: Jul. 15, 2021

(65) Prior Publication Data
US 2023/0137099 A1 May 4, 2023

Related U.S. Application Data

(60) Provisional application No. 62/959,500, filed on Jan. 10, 2020.

(51) Int. Cl.
*B60J 10/82* (2016.01)
*B60J 7/11* (2006.01)
(Continued)

(52) U.S. Cl.
CPC ............ *B60J 10/82* (2016.02); *B60J 7/11* (2013.01); *B60J 7/194* (2013.01); *B60R 21/13* (2013.01); *B60R 2021/132* (2013.01)

(58) Field of Classification Search
CPC .............. B60J 7/11; B60J 10/82; B60J 10/85
(Continued)

(56) References Cited

U.S. PATENT DOCUMENTS 4,219,230 A * 8/1980 Lapine ............... B60J 10/82
296/218
4,582,358 A 4/1986 Draper
(Continued)

FOREIGN PATENT DOCUMENTS

EP 1598229 A1 * 11/2005 ............... B60J 7/11
JP 4032250 B2 * 1/2008 ............. B60J 10/24
(Continued)

OTHER PUBLICATIONS

Text JP4032250 (Year: 2008).*
(Continued)

*Primary Examiner* — Dennis H Pedder
(74) *Attorney, Agent, or Firm* — MaxGoLaw PLLC

(57) ABSTRACT

A vehicle removable roof system including a fixed vehicle structure, one or more removable panels configured to engage with the fixed vehicle structure, and a water management system positioned between the one or more removable panels and the fixed vehicle structure. The removable panels may be formed of a composite sandwich panel assembly, which may include an open area core defining pores, a high gloss surface sheet adhered to a first face of the open area core by a first adhesive layer, and a structural skin adhered to a second side of the open area core by a second adhesive layer. The removable panels are configured for installation to and removal from the fixed vehicle structure by a single user and without the use of tools.

15 Claims, 13 Drawing Sheets

(51) Int. Cl.
B60J 7/19 (2006.01)
B60R 21/13 (2006.01)

(58) Field of Classification Search
USPC .............. 296/218, 216.09, 213, 220.01
See application file for complete search history.

(56) References Cited

U.S. PATENT DOCUMENTS

| | | | |
|---|---|---|---|
| 4,803,108 A | 2/1989 | Leuchten et al. | |
| 6,053,568 A * | 4/2000 | Jambor | B60J 7/0015 |
| | | | 296/213 |
| 6,220,656 B1 * | 4/2001 | Martin, Jr. | B60J 7/11 |
| | | | 49/501 |
| 6,309,007 B1 * | 10/2001 | Essig | B60J 10/00 |
| | | | 296/218 |
| 6,533,343 B2 * | 3/2003 | Bohm | B60J 7/041 |
| | | | 296/100.06 |
| 6,827,392 B2 * | 12/2004 | Doncov | B60J 7/04 |
| | | | 296/213 |
| 8,979,183 B2 * | 3/2015 | Schulz | B60J 7/106 |
| | | | 296/218 |
| 8,991,896 B1 * | 3/2015 | Whitehead | B60J 7/196 |
| | | | 296/121 |
| 9,180,762 B2 * | 11/2015 | Jeakle | B60J 7/11 |
| 9,931,920 B1 | 4/2018 | Stojkovic et al. | |
| 2003/0168880 A1 * | 9/2003 | Burkel | B60J 7/106 |
| | | | 296/103 |
| 2004/0150252 A1 | 8/2004 | Schlachter et al. | |
| 2019/0283361 A1 * | 9/2019 | Jia | B32B 5/024 |
| 2021/0178874 A1 * | 6/2021 | Boyle | B60J 1/1884 |

FOREIGN PATENT DOCUMENTS

| | | |
|---|---|---|
| JP | 2019043162 A | 3/2019 |
| WO | 2013112957 A1 | 8/2013 |
| WO | 2020142765 A1 | 7/2020 |

OTHER PUBLICATIONS

EP1598228 Text (Year: 2005).*
Int'l Search Report for PCT/US2021/012903, dated Apr. 23, 2021.
Extended EP Search Report issued in corresponding European Patent Appln. No. 21738620.0, dated Nov. 24, 2023.

* cited by examiner

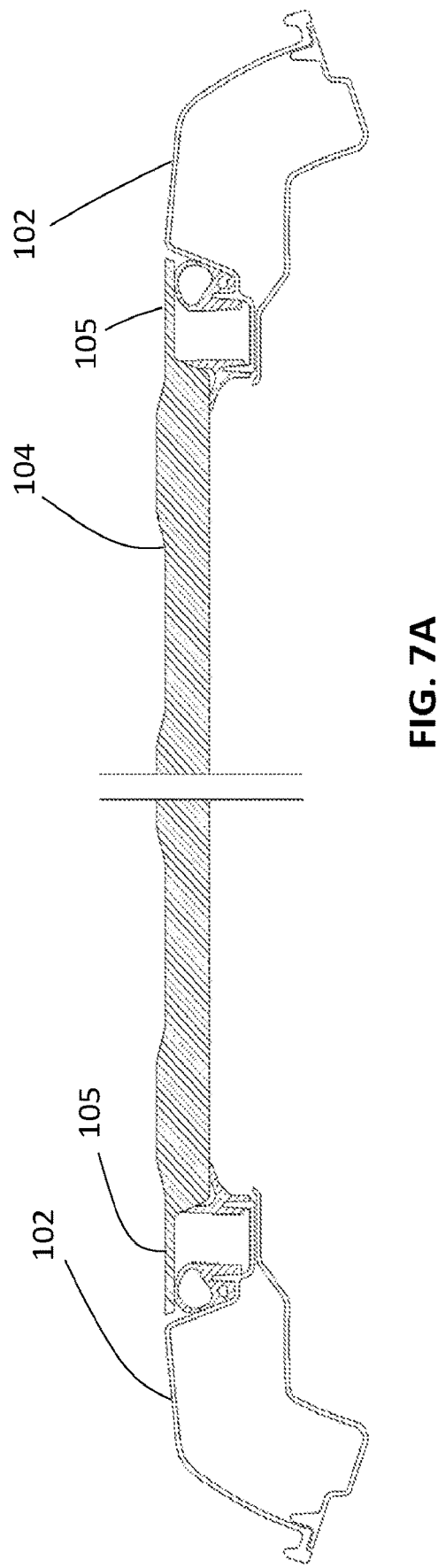

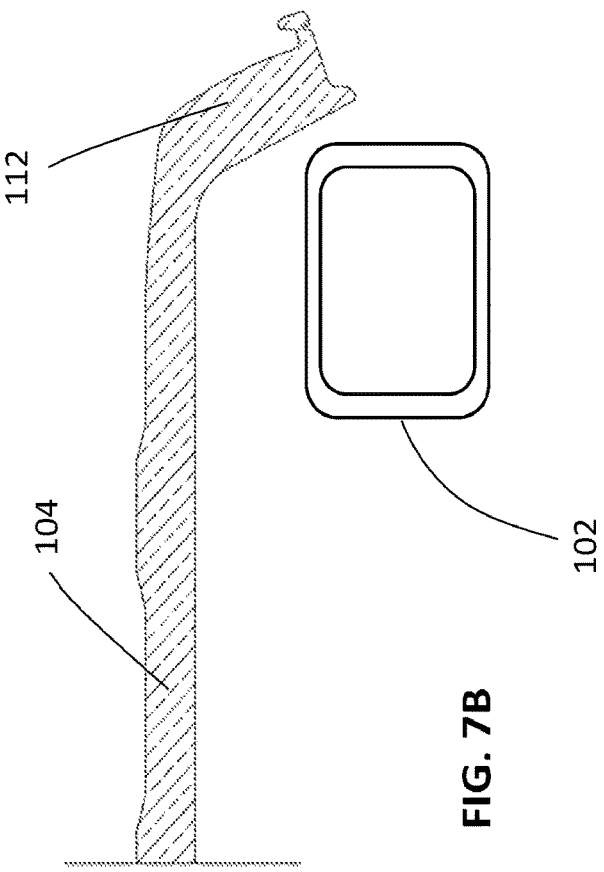
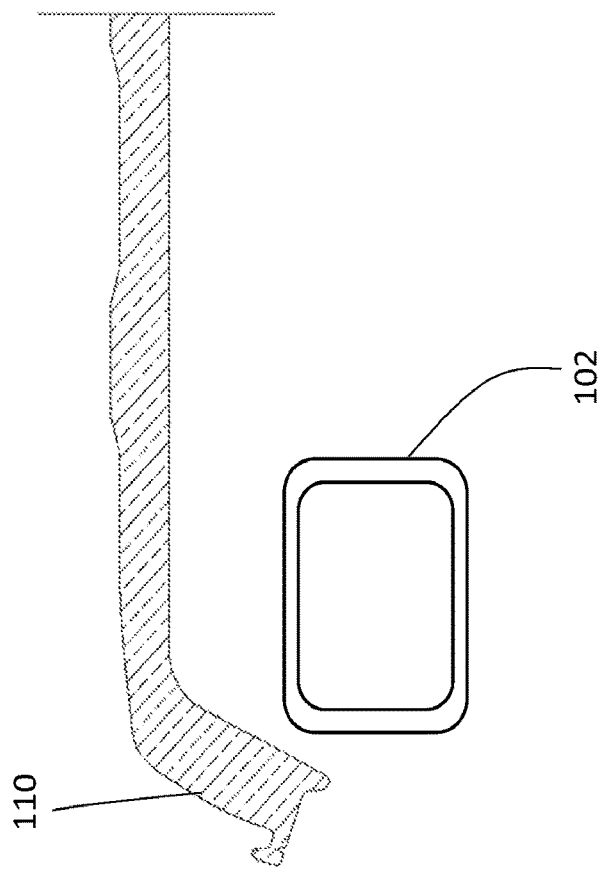
FIG. 7B

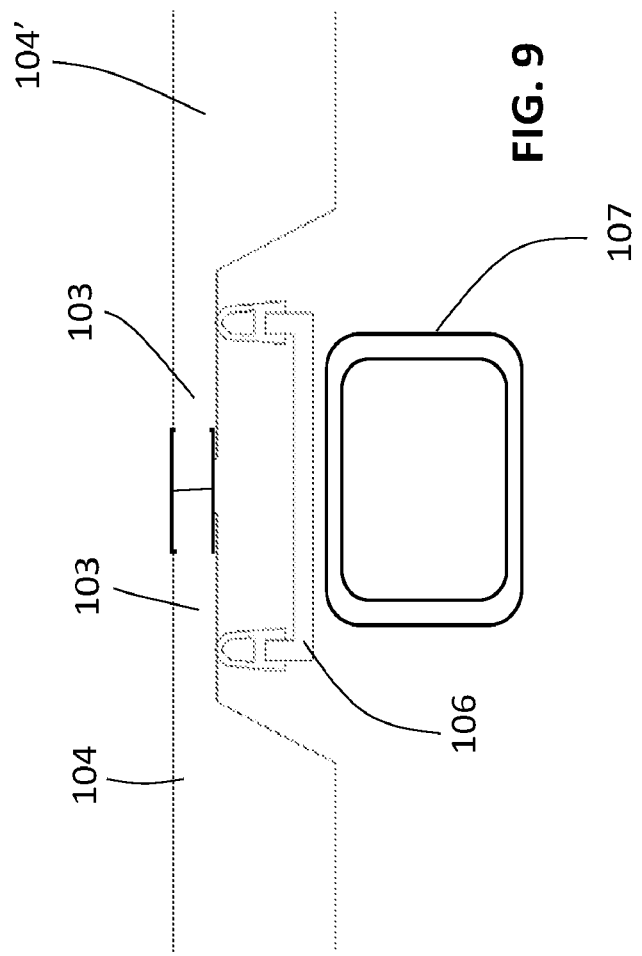

MULTI-PANEL REMOVABLE ROOF SYSTEM

CROSS-REFERENCE TO RELATED APPLICATION

This application claims priority of U.S. Provisional Patent Application Ser. No. 62/959,500 filed Jan. 10, 2020, which is incorporated herein by reference.

FIELD OF THE INVENTION

The present invention in general relates to a vehicle roof assembly and, more particularly to a removable vehicle roof with a water management system and improved sealing to prevent water and moisture infiltration.

BACKGROUND OF THE INVENTION

Vehicles are generally constructed around a frame, where a vehicle's finished surface panels are secured or bonded to substructures to form body panels that are designed for attachment to the irregular surfaces of the frame. These structures typically include a finished surface outer panel bonded at multiple points to a structural inner panel that may be stamped from sheet metal or formed from composite materials such as SMC. The periphery of outer panel (outer skin) and structural inner panel are typically bonded together at the edges.

Vehicles with removable hard top panels, especially for sport utility vehicles (SUV) and jeeps have become increasingly popular. The removable nature of the hard top panels requires weather-stripping and a water management system with a discharge path to direct water to a vehicles' exterior thereby ensuring the vehicles occupants remain dry from rain and snow.

However, existing designs for sealing removable vehicle hardtop panels are not always affective and are prone to failure overtime, thereby leading to incursion of moisture to a vehicle interior. The moisture incursion is pronounced where the removable panels join together with each other and with the non-removable portion of a vehicle roof. Furthermore, existing designs for removable vehicles roof tops are cumbersome, often requiring tools and/or more than one user to install and remove the roof, and only provide a single installation configuration, thereby limiting customization and utility of the roof system.

Thus, there exists a need for an improved removable roof system that is easily configurable by a single user and that provides a seal that prevents incursion of moisture to a vehicle interior.

SUMMARY

The present disclosure provides a vehicle removable roof system that includes a fixed vehicle structure, one or more removable panels configured to engage with the fixed vehicle structure, and a water management system positioned between the one or more removable panels and the fixed vehicle structure. The removable panels may be formed of a composite sandwich panel assembly, which may include an open area core defining a plurality of pores, a high gloss surface sheet adhered to a first face of said open area core by a first adhesive layer, and a structural skin adhered to a second side of said open area core by a second adhesive layer. The removable panels are configured for installation to and removal from the fixed vehicle structure by a single user and without the use of tools.

BRIEF DESCRIPTION OF THE DRAWINGS

The present invention is further detailed with respect to the following drawings that are intended to show certain aspects of the present invention, but should not be construed as a limit on the practice of the present invention.

FIGS. 7A and 7B show cross sectional view of a removable panel as indicated in FIGS. 1 and 4, respectively;

FIG. 9 shows a cross sectional view of the interaction of removable panels and a water management system according to embodiments of the present disclosure;

DESCRIPTION OF THE INVENTION

Figure 1:
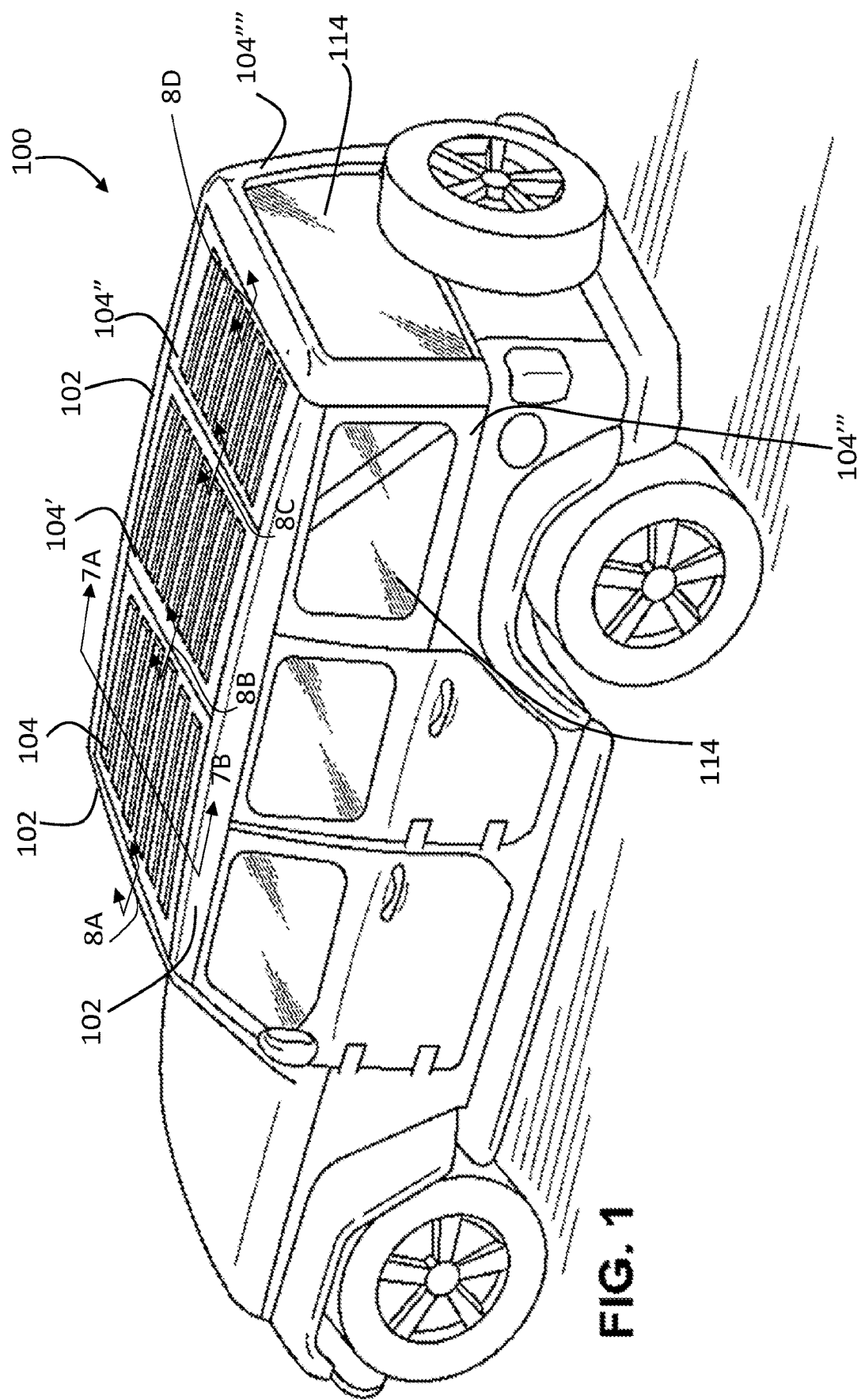
FIG. 1 is a perspective view of a vehicle removable roof system according to embodiments of the present disclosure installed on a vehicle.

The present invention has utility as improved removable roof system that is easily configurable by a single user and that provides a seal with improved moisture resistance and edges suitable for sealing the removable roof assembly to other vehicle components. Embodiments of the inventive vehicle removable roof system offer improved manufacture and long term performance reliability over previous designs.

The present invention will now be described with reference to the following embodiments. As is apparent by these descriptions, this invention can be embodied in different forms and should not be construed as limited to the embodiments set forth herein. Rather, these embodiments are provided so that this disclosure will be thorough and complete, and will fully convey the scope of the invention to those skilled in the art. For example, features illustrated with respect to one embodiment can be incorporated into other embodiments, and features illustrated with respect to a particular embodiment may be deleted from the embodiment. In addition, numerous variations and additions to the embodiments suggested herein will be apparent to those skilled in the art in light of the instant disclosure, which do not depart from the instant invention. Hence, the following specification is intended to illustrate some particular embodiments of the invention, and not to exhaustively specify all permutations, combinations, and variations thereof.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

Unless indicated otherwise, explicitly or by context, the following terms are used herein as set forth below.

As used in the description of the invention and the appended claims, the singular forms "a," "an" and "the" are intended to include the plural forms as well, unless the context clearly indicates otherwise.

Also as used herein, "and/or" refers to and encompasses any and all possible combinations of one or more of the associated listed items, as well as the lack of combinations when interpreted in the alternative ("or").

Referring now to the figures, an inventive vehicle removable roof system is shown generally at 100 and includes a fixed vehicle structure 102, one or more removable panels 104, 104', 104", 104''', 104'''', 104''''' each configured to engage with the fixed vehicle structure 102, and a water management system 106 positioned between the one or more removable panels 104, 104', 104", 104''', 104'''', 104''''' and the fixed vehicle structure 102.

According to embodiments the fixed vehicle structure 102 includes roll bars 107 of the vehicle. The fixed vehicle structure 102 may also include vehicle pillars 108, such as the A-pillar, B-pillar, C-pillar, and D-pillar. According to embodiments, the fixed vehicle structure is tied into the frame of the vehicle.

According to embodiments, one or more of the removable panels 104, 104', 104", 104''', 104'''', 104''''' are formed of any of a composite sandwich panel assembly, aluminum, SMC, stamped steel, or a combination thereof. According to embodiments, the removable panels 104, 104', 104", 104''', 104'''', 104''''' are formed of a composite sandwich panel assembly that includes an open area core defining a plurality of pores, a high gloss surface sheet adhered to a first face of said open area core by a first adhesive layer, and a structural skin adhered to a second side of said open area core by a second adhesive layer. Further details of a composite sandwich panel assembly that may be used to form one or more of the removable panels 104, 104', 104", 104''', 104'''', 104''''' are described in International Application Serial No. PCT/US2020/12350 filed on Jan. 6, 2020, which is thereby incorporated by reference.

Figure 10:
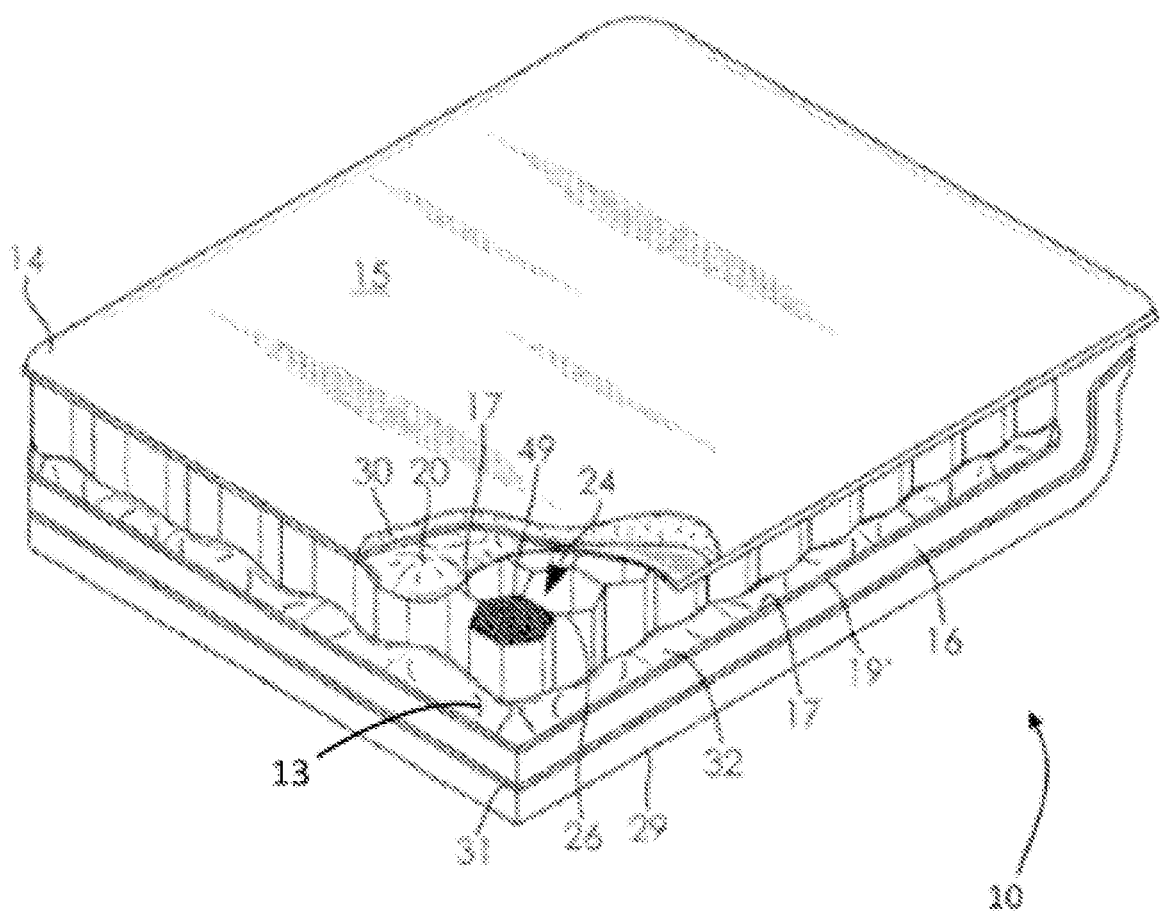
FIG. 10 is a partial cutaway, perspective view of composite sandwich assembly used to form components of a vehicle removable roof system according to embodiments of the present disclosure.
Figure 11:
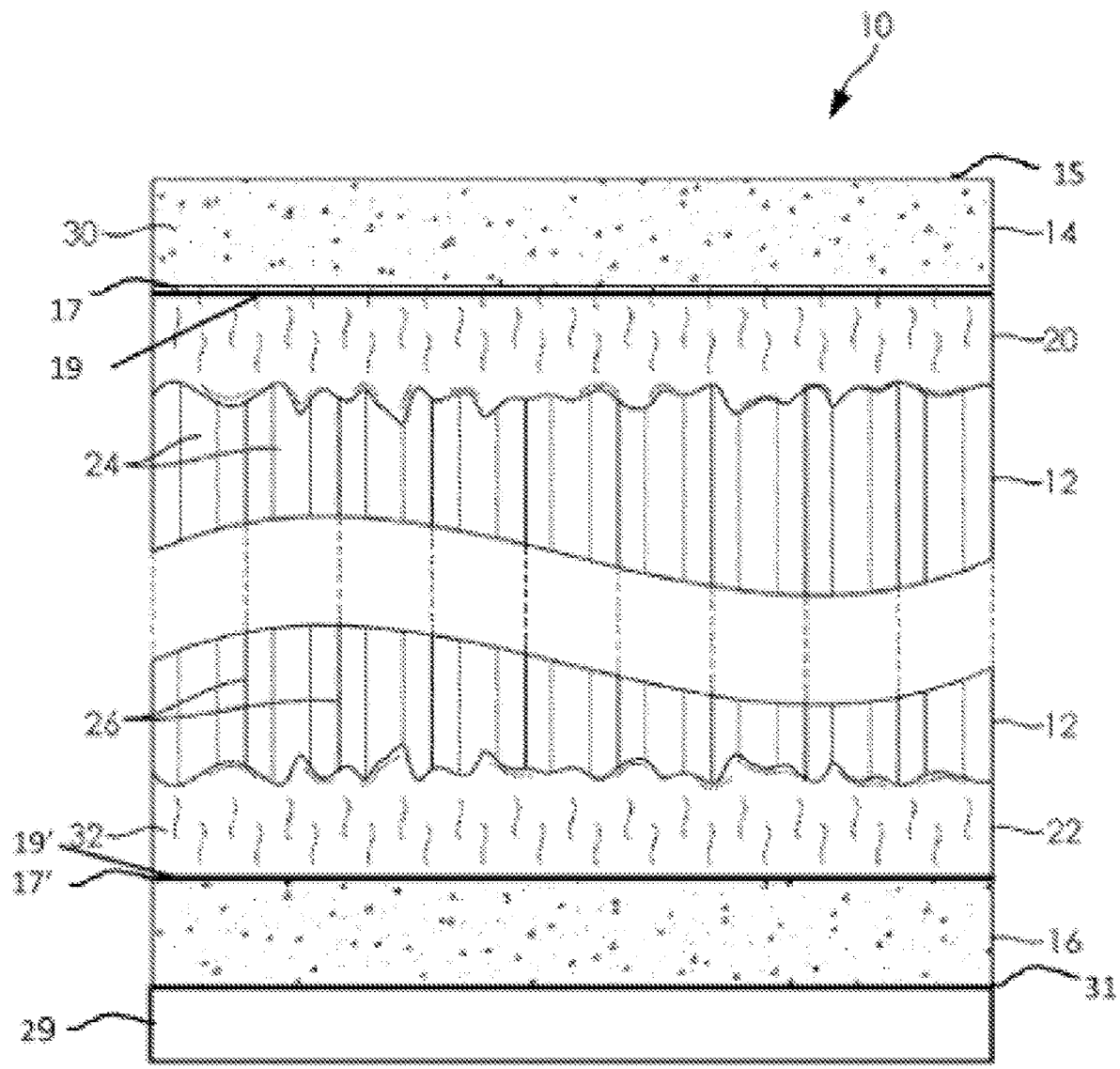
FIG. 11 is an enlarged partial cutaway, side view of a composite sandwich assembly of FIG. 10 along a line bisecting the hexagonal pores.
Figure 12A:
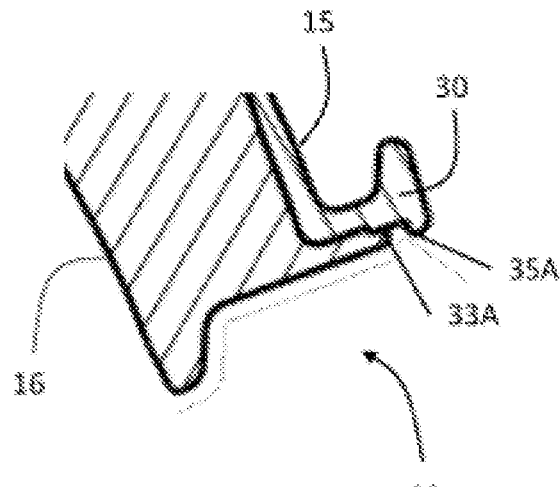
FIGS. 12A-12D are cross-sectional views of edges of a composite sandwich assembly of FIG. 11.
Figure 12B:
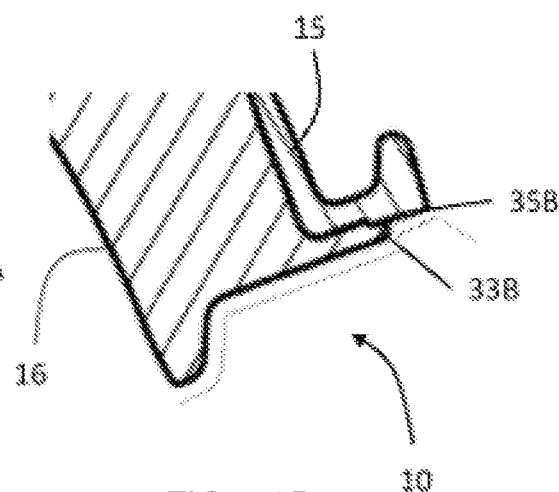
Figure 12C:
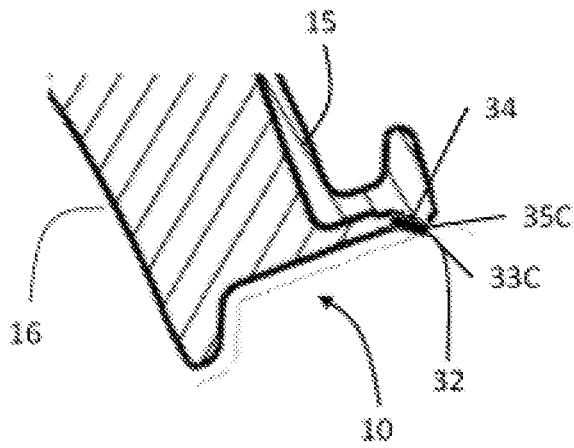
Figure 12D:
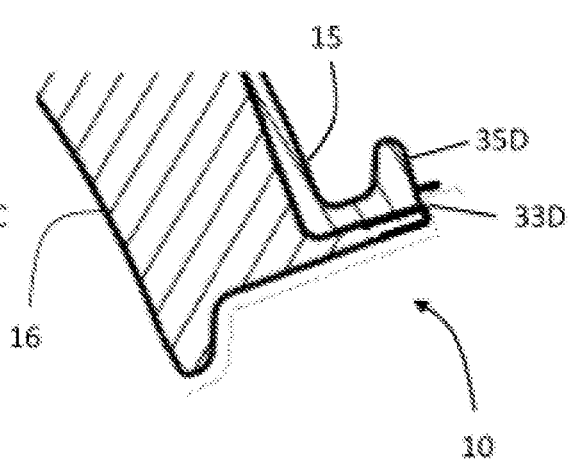

As will be understood from the description herein, the composite sandwich panel assembly 10 is a light weight, high strength part with a high gloss surface suitable for exterior automotive finishes. The composite sandwich panel assembly 10 provides reduced delamination of the components and reduced bond line readthrough into the high gloss surface sheet. Additionally, the composite sandwich panel assembly 10 provides watertight edges to prevent infiltration of humidity or moisture that can reduce the operational lifetime of the structure, particularly with temperature extremes experienced by roof assemblies. According to embodiments, the sandwich 10 has an open area core 12 with walls 26 defining an ordered array of pores 24 terminating in faces 17 and 17'. The open area core 12 is positioned between a high gloss surface sheet 14 on one side and a structural skin 16 on an opposite side therefrom. As shown in FIG. 10, a portion of the high gloss surface sheet 14 is cutaway to reveal the adhesive 20, a cloth, if present; and the open area core 12. The high gloss surface sheet 14 is adhered to a first side of the open area core 12 by a first adhesive layer 20 and presents an outwardly facing high gloss surface 15. FIG. 11 is an enlarged cross-sectional view of a composite sandwich 10 suitable for forming components of the vehicle removable roof system 100 according to embodiments of the invention showing further details of the various layers making up the composite sandwich. In some cases, a cloth 19 is present intermediate between the face 17 of the open area core 12 and the high gloss surface sheet 14, the cloth 19 embedded within the adhesive 20. The structural skin 16 is adhered to an opposing second side of the open area core 12 by a second adhesive layer 22. In some cases, a cloth 19' is present intermediate between the face 17' of open area core 12 and the structural skin 16, the cloth 19' embedded within the adhesive 22. While the structure 10 depicted in FIGS. 10 and 11 is planar, it is appreciated that both the high gloss surface and the structure surface are each independently formed with non-planar contours.

The open area core 12 is formed of a lightweight material that defines a plurality of pores 24 so as to reduce the overall density of the open area core 12. The pores 24 are in shapes that illustratively include hexagonal, circular, rhomboidal, triangular, parallelogram quadrilateral, and regular quadrilateral. The faces 17 and 17' of the open area core 12 support the tensioned high gloss surface sheet 14 and structural skin 16 when the composite sandwich 10 is assembled and transfer externally applied forces within the structure 10. The open area core 12 is formed from a variety of materials that include cellulosics such as corrugated fiberboard, paper board, paper stock; thermoplastics such as poly(methyl methacrylate) (PMMA), acrylonitrile butadiene styrene (ABS), polyamides, polylactides, polybenzimidazoles, polycarbonates, polyether sulfones, polyethylene, polypropylene, polystyrene, polyvinyl chloride, and block copolymers of any one of the aforementioned where at least one of the aforementioned makes up the majority by weight of the copolymer and regardless of the tacticity of the polymer or copolymer; thermosets such as polyesters, polyureas, polyurethanes, polyurea/polyurethanes, epoxies, vinyl esters; metal such as aluminum, magnesium, and alloys of any one of the aforementioned where at least one of the aforementioned metals constitutes the majority by weight of the alloy; a foam formed from polyurethane, polyethylene, ethylene vinyl acetate, polypropylene, polystyrene, polyvinyl chloride, or aerogels, regardless of whether the foam is open-celled or closed-celled.

The pores 24 defined by walls 26 of the open area core 12 extend between faces 17 and 17'. In some embodiments, the walls 26 are treated to modify a property thereof such as hydrophobicity or surface energy to promote adhesion thereto. By way of example, cellulosics are prone to moisture uptake and are readily coated with a wax such as a paraffin, or a silicone to render the cellulosic more hydrophobic compared to a native state. Alternatively, the cellulosic is readily alkylated by conventional reactions such as those with chloroacetic acid. Sarymsakov, A. A et al., Chem. Nat. Compd. (1997) 33:337. Metals are similarly coated with a primer or other corrosion inhibitor. Alternatively, metals or polymers are plasma treated to modify surface energies to facilitate adhesion thereto.

In certain inventive embodiments, the ratio of the thickness of a wall 26 to the maximal linear extent between faces 17 and 17' is between 0.01-10:1. A wall thickness ranges from 0.1 mm to 100 mm in such inventive embodiments.

The high gloss surface sheet 14 of the composite sandwich panel 10 forming the removable panel is formed from sheet molding compound (SMC), thermoplastic, dicyclopentadiene (DCPD), overmolded polyurethane (PU), or a combination thereof. According to embodiments, the high gloss surface sheet 14 includes a filler material 30 to reinforce and/or serve to decrease the weight of the high gloss surface sheet 14. The filler material 30 is any of glass fibers, carbon fibers, natural fibers, hollow or solid glass microspheres, or a combination thereof. The fibers may be oriented or non-oriented. In some inventive embodiments in which SMC forms the high gloss surface, a resin package sold by Continental Structural Plastics, Inc. under the tradenames TCA® and TCA® ULTRA-LITE™ are used herein. Exemplary formulations of which are detailed in U.S. Pat. No. 7,700,670; WO2017/184761; and U.S. Pat. No. 7,524,547B2. It is appreciated that the high gloss sheet routinely includes additives to retain dimensionality. Such additives routinely including glass fiber; carbon fiber; inorganic particulate fillers such as calcium carbonate, talc, and carbon black; glass microspheres; carbon nanotubes; graphene; low profile additives; moisture scavengers; and combinations thereof. Typical thicknesses of the high gloss surface sheet in the present invention range from 0.5 to 3.5 millimeters (mm) without regard to edges.

The high gloss surface sheet 14 is adhered to a first side of the open area core 12 by a first adhesive layer 20. The first adhesive layer 20 is formed of either a thermoplastic or curable formulation. According to certain inventive embodiments, the first adhesive layer 20 is a polyurethane or polyurethane prepolymer adhesive, which may be in the form of glue, a moisture cure adhesive, a reactive hot melt adhesive, or a polyurethane resin. As best shown in FIG. 11, due to the compressive force applied to the first adhesive layer 20 between the high gloss surface sheet 14 and the open area core 12, the adhesive 20 is engineered to have an initial viscosity on contact with the face 17 and the walls 26 so as partially fill the pores 24 of the open area core 12. It is appreciated that the viscosity upon application is a function of factors that include application temperature, pore dimensions at the face, and intrinsic adhesive viscosity. The viscosity of the first adhesive layer 20 ensures that the adhesive does not excessively run into the pores defined in the open area core before the adhesive attains final strength. Accordingly, the adhesive surface area for adhesion between a high gloss surface sheet and an open area core is at least 5% more than surface area of the walls at the face. In still other embodiments, the adhesive area is between 5 and 100 surface area percent of the face, and even 100 surface area percent in still other inventive embodiments. This increased surface area of adhesion reduces delamination of the components of the inventive composite sandwich 10 and surprisingly allows for the use of thinner high gloss surface sheets that do not exhibit bond line read through. As a result of increasing the adhesive surface area coverage from 10 to 50 surface area percent allows for the comparatively expensive high gloss surface sheet to be reduced in thickness from 1.5 mm to between 1.3 and 0.8 mm while still retaining high gloss through prevention of bond line read through.

In some embodiments, a cloth 19 is embedded in the first adhesive layer 20. The cloth can be woven or nonwoven yet having sufficient porosity to allow the adhesive layer 20 to penetrate therethrough. The cloth 19 provides a larger surface area for adhesive layer 20 and mitigates surface tension differences relative to structural layer 16 associated with situations such as the manufacturing process, temperature differences in a use environment, and differential force loading during usage. A cloth 19 operative herein illustratively includes fibers of thermoplastic materials such as poly(methyl methacrylate) (PMMA), acrylonitrile butadiene styrene (ABS), polyamides, polylactides, polybenzimidazoles, polycarbonates, polyether sulfones, polyethylene, polypropylene, polystyrene, polyvinyl chloride, and block copolymers of any one of the aforementioned where at least one of the aforementioned makes up the majority by weight of the copolymer and regardless of the tacticity of the polymer or copolymer; carbon fibers; polyaramids; glass fibers in the form as a woven, roving, or lofted sheet; and mixtures of the various fibers. The cloth 19 has a mesh size of 10 to 1000, that is, the mesh layer has 10 to 1000 opening per square inch. The cloth 19 tends to reduce the effects of the walls 26 on the outward appearance of the high gloss surface sheet 14.

The structural skin 16 is adhered to the second side of the open area core 12 by a second adhesive layer 22. The structural skin 16 is formed of a fiber mat, a thermoplastic sheet, or an SMC. In some embodiments the SMC is also a high gloss surface as detailed about with respect to reference numeral 14. In embodiments where the structural skin 16 is a fiber mat, the fiber mat is formed of glass fibers 13 as shown in FIG. 10. According to certain embodiments, the fiber mat forming the structural skin includes non-oriented, non-woven fibers, unidirectional, or woven fibers. The structural skin 16 is adhered to the second side of the open area core 12 by a second adhesive layer 22. The second adhesive layer 22 having the attributes of the first adhesive layer detailed above with respect to reference numeral 20. In some embodiments, the same adhesive forms both first adhesive layer 20 and second adhesive layer 22. In still other inventive embodiments, a cloth 19' is present within the second adhesive layer 22, the cloth 19' having the attributes of the cloth 19 as detailed above. In some embodiments where both cloths 19 and 19' are present, the cloths 19 and 19' are formed of the same material. In still other embodiments, the cloths 19 and 19' are formed of the same material and have the same thickness. In still other embodiments, the cloths 19 and 19' are formed of the same material, have the thickness, and are adhered by the same adhesive. In still other embodiments, the surface tension on the high gloss surface sheet 14 and the structural skin 16 are within 10% of one another.

According to embodiments, the thickness of the open area core 12, the high gloss surface sheet 14, and the structural skin may vary based on design parameters and intended use of a finished component for the inventive vehicle removable roof system 100 formed of the present disclosure. As noted above, the high gloss surface sheet 14 has a thickness of 0.5 to 3.5 mm. The ratio of the high gloss surface sheet 14 average thickness to the open area core 12 average thickness is 0.01-1:1, while the ratio of the structural skin 16 thickness to the open area core 12 thickness is 0.1-1:1. In a particular inventive embodiment, the high gloss surface sheet 14 has an average thickness of 1.5 to 5 mm and the open area core 12 has an average thickness of 6 to 25 mm. In some inventive embodiments the open area core 12 average thickness is as much as 100 mm.

According to some embodiments, a decorative layer 29 is attached to the exposed surface 31 of the structural skin 16. In some embodiments, the decorative layer 29 is a vehicle interior surface. A decorative layer 29 illustratively includes flocking, textile, carpet, leather, textured soft-touch plastic, thermoplastic film, or a combination thereof.

According to certain inventive embodiments, the composite sandwich panel assembly provides sound damping, fire retardancy, thermal insulation, or a combination thereof by placing a sound and/or heat absorbing material within the pores 24 of the open area core 12. According to embodiments, the pores 24 of the open area core 12 are at least partially filled with foam pellets, fire retardant, or a phase change material 49. Phase change materials operative herein include waxes or an inorganic salt hydrates. This feature can assist in regulating the temperature within the vehicle interior given the at the vehicle removable roof system, when installed on the vehicle, encounters extreme weather conditions such as sunlight, rain, ice, or snow.

The high gloss surface sheet 14 and the structural skin 16 are joined together along an edge 33A-33D of the composite sandwich panel assembly to form a seal, as shown in FIGS. 12A-12D, respectively. In certain inventive embodiments of the vehicle removable roof system 100, all of the edges of the composite sandwich panel assembly 10 are sealed such that the open area core 12 is fully enclosed and moisture is inhibited from entering the interior of the composite sandwich panel assembly 10. Given the intended use and location of the removable panel and other components of the inventive vehicle removable roof structure 100 formed of the composite sandwich panel assembly 10, preventing moisture from entering the interior of the composite sandwich panel assembly 10 is important given that freeze thaw cycles of moisture within the part cause expansion and potentially failure of the assembly 10. Additionally, in embodiments in which the open area core 12 is formed of a hydrophilic material such as paper, moisture within the composite sandwich panel assembly 10 would destroy the open are core 12 and cause the roof panel to fail.

FIGS. 12A-12D show various embodiments of ways in which the high gloss surface sheet 14 and the structural skin 16 are joined together to form a sealed edge 33A-33D, respectively. In some embodiments an elastomeric gasket 34 is disposed between the high gloss surface sheet 14 and the structural skin 16 at the 33C to make the edge 33C more water resistant. It is appreciated that a gasket is readily included in the other edge joinder 33A, 33B, and 33D. The gasket 34 enhances maintenance of the edge seal over a wider range of use conditions.

According to embodiments, the removable panels 104, 104', 104", 104''', 104'''', 104''''' include horizontally oriented roof panels, such as removable panels 104, 104', and 104", vertically oriented panels, such as removable panels 104''', 104'''', 104''''', or a combination thereof. According to embodiments, any combination of the removable panels 104, 104', 104", 104''', 104'''', 104''''', including the use of none of the removable panels, may be used at a given time. According to embodiments, each of the removable panels 104, 104', 104", 104''', 104'''', 104''''' have the same outer dimensions, thereby allowing the removable panels to be interchangeable with one another and therefore easily reconfigurable and customizable. Furthermore, the removable panels 104, 104', 104", 104''', 104'''', 104''''' are dimensioned, weighted, and otherwise configured for installation to and removal from the fixed vehicle structure 102 by a single user.

Figure 4:
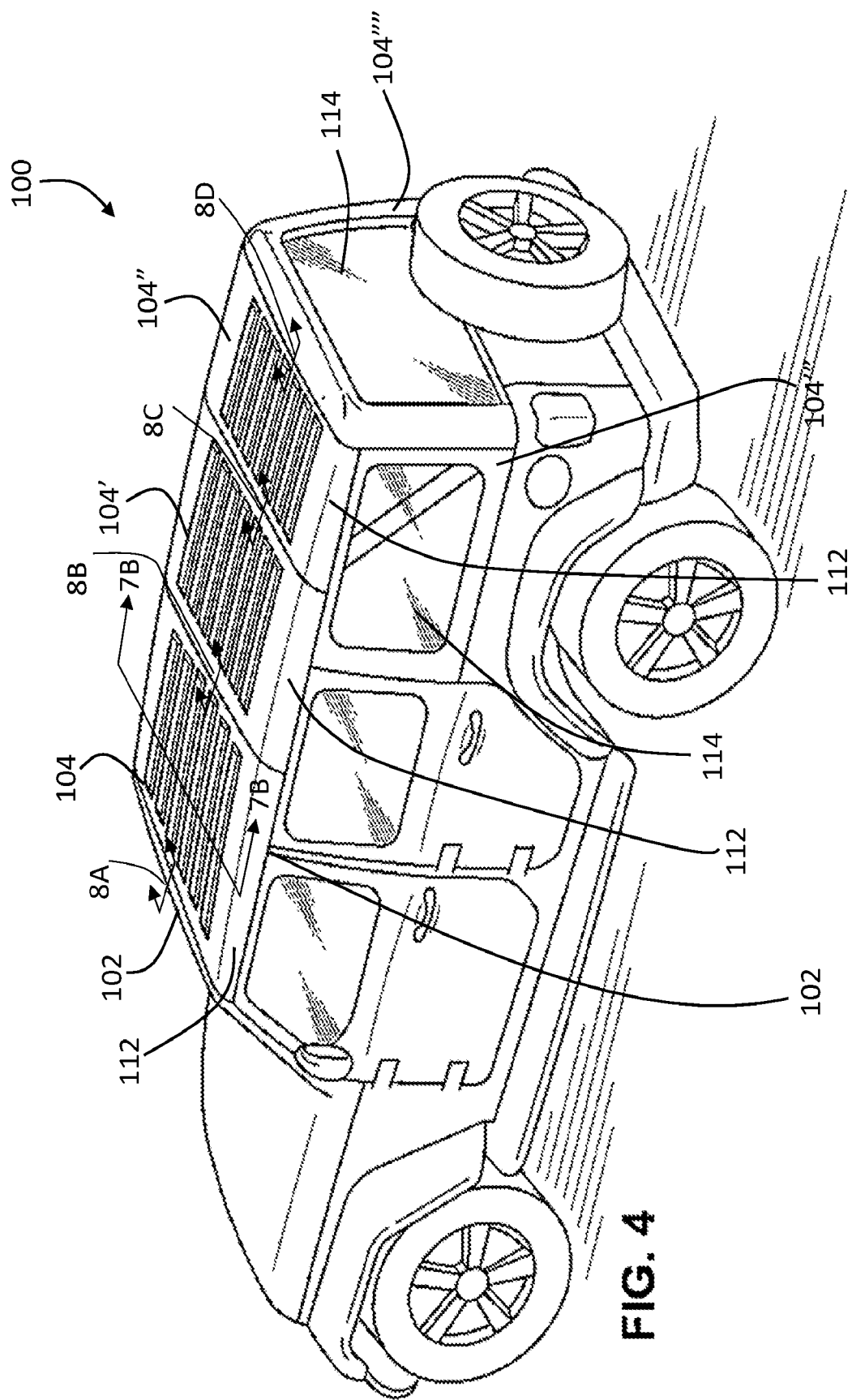
FIG. 4 is a perspective view of a vehicle removable roof system according to embodiments of the present disclosure installed on a vehicle.
Figure 5:
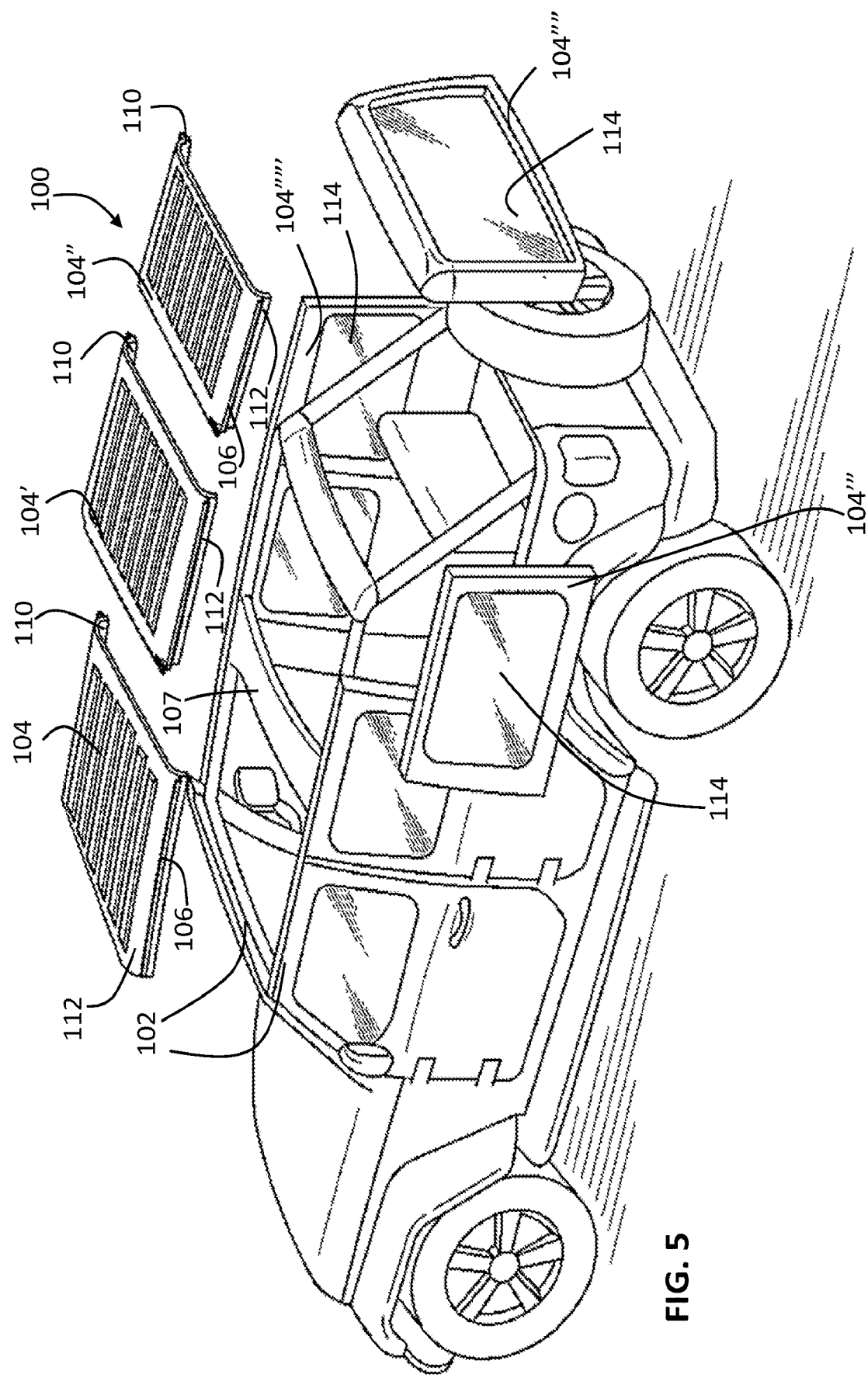
FIG. 5 is an exploded perspective view of the vehicle removable roof system of FIG. 4.

According to embodiments, one or more of the removable panels 104, 104', 104", 104''', 104'''', 104''''' includes corrugations, such as those shown on removable panels 104, 104', and 104". Such corrugations can provide increased strength and rigidity or the removable panels and may provide a desirable aesthetic appearance to an outer surface of the removable panels. Furthermore, according to embodiments, one or more of the removable panels 104, 104', 104", 104''', 104'''', 104''''' are generally planar, such as those shown in FIGS. 2 and 3. FIG. 7A shows a cross sectional view of a generally planar removable panel 104. Such planar removable panels are configured to be positioned within the fixed vehicle structure 102, for example in a nesting fashion. As shown in FIG. 7A, the generally planar removable panels 104, 104', 104", 104''', 104'''', 104''''' may additionally include flanges 105 along the side edges that are configured to engage with the fixed vehicle structure 102. Alternatively, or in combination therewith, one or more of the removable panels 104, 104', 104", 104''', 104'''', 104''''' has a first flange 110 extending from a first end and a second flange 112 extending from a second end of the removable panel, such as shown in FIGS. 4 and 5. FIG. 7B shows a cross sectional view of a flanged removable panel 104. According to such embodiments, the flanges 110, 112 are configured to extend over the fixed vehicle structure 102 to engage therewith, thereby additionally reducing water and moisture penetration into the vehicle compartment. According to embodiments, such as shown in FIGS. 8A-8D, the front and back edges of the removable panels 104, 104', 104", 104''', 104'''', 104''''' additionally include flanges 103 that are configured to engage with one another such that the panels nest together within the fixed vehicle structure 102.

According to embodiments, one or more of the removable panels 104, 104', 104", 104''', 104'''', 104''''' includes a transparent portion 114, such as that shown in panels 104''', 104'''', and 104'''''. According to embodiments, the transparent portion 114 is formed of glass or clear polycarbonate. According to embodiments, the transparent portion 114 is co-molded with the removable panel 104, 104', 104", 104''', 104'''', 104''''' as described in U.S. Provisional Application Ser. No. 62/859,796 filed on Jun. 11, 2019, the details of which are hereby incorporated by reference. Thus, any removable panel containing a transparent portion 114 may be installed within the fixed vehicle frame 102 in a vertically oriented position such that the removable panel functions as a side window or a rear window, or may be installed within the fixed vehicle frame 102 in a horizontally oriented position such that the removable panel functions as a moon roof or sun roof.

Figure 6:
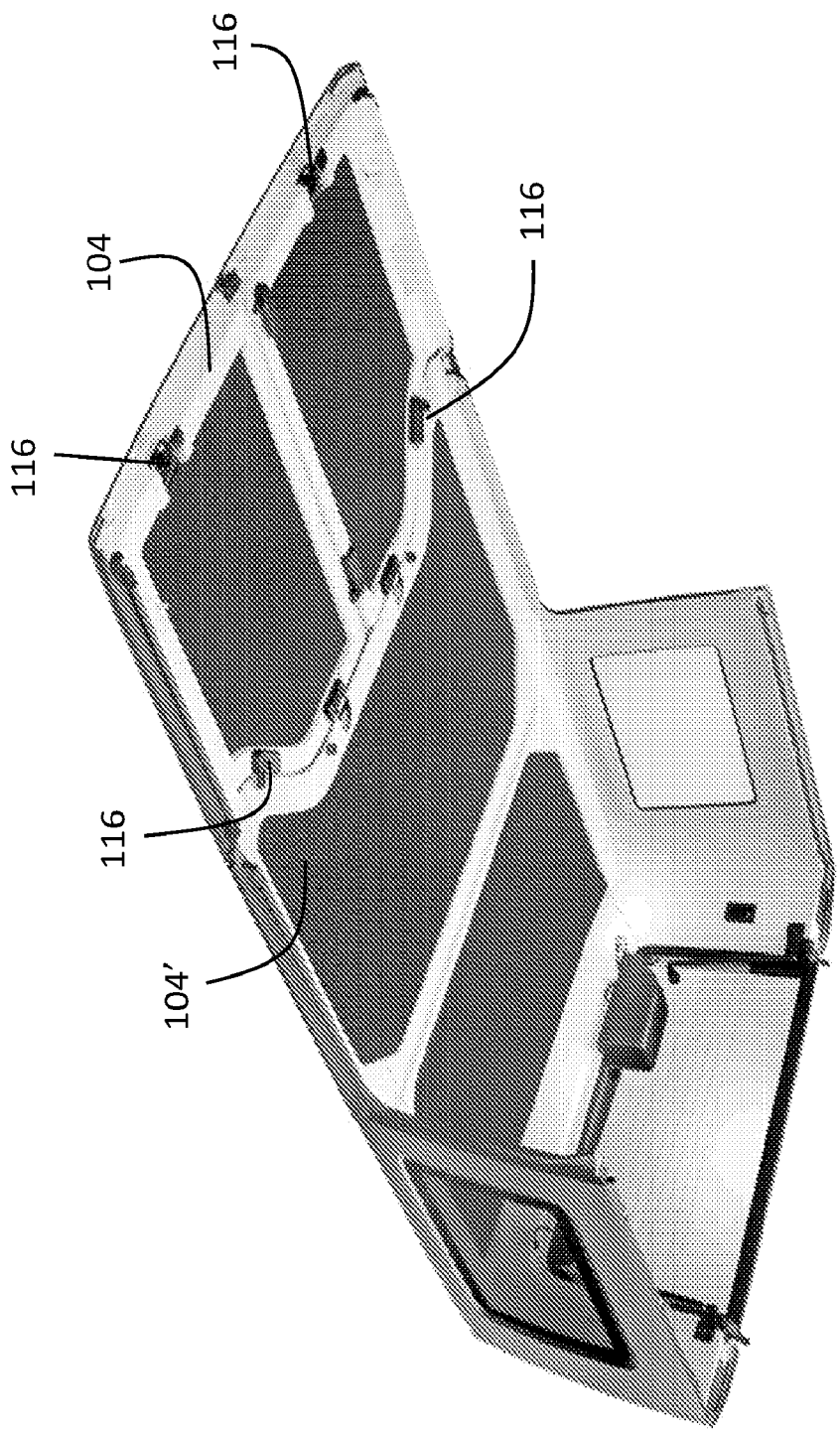
FIG. 6 shows an interior side of a removable panel according to embodiments of the present invention.
Figure 8A:
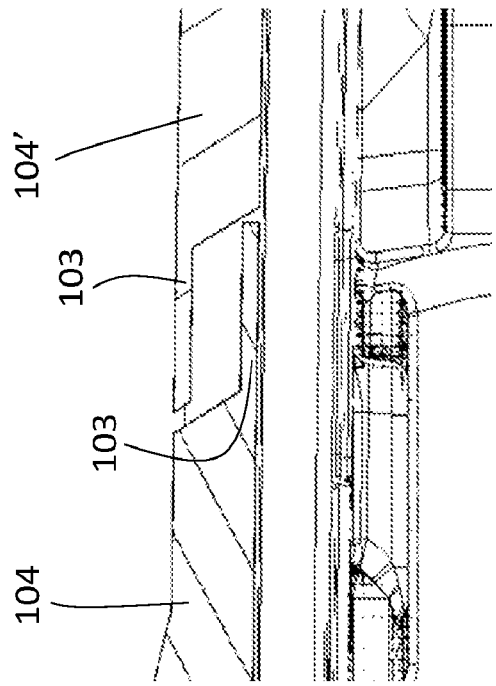
FIGS. 8A-8D show cross sectional views of the interaction of removable panels as indicated in FIGS. 1 and 4, respectively.
Figure 8B:
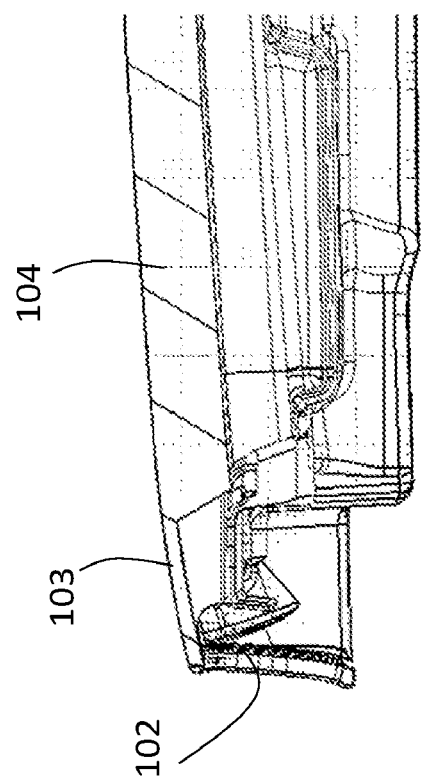
Figure 8C:
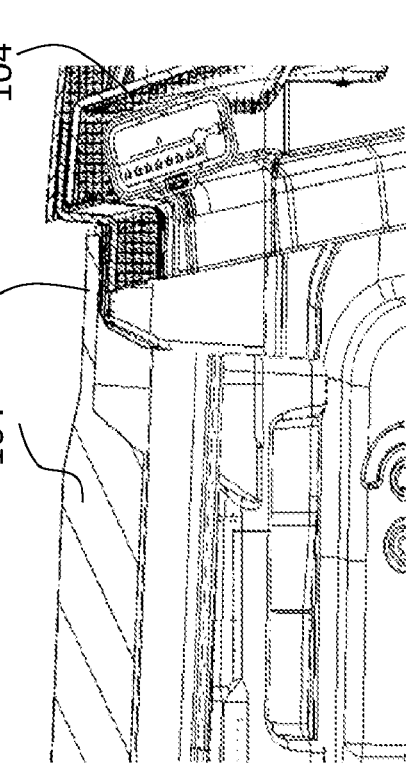
Figure 8D:
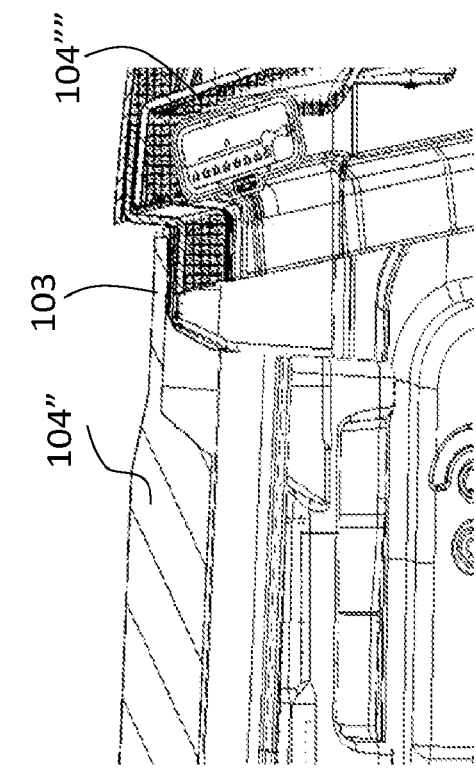

According to embodiments, the inventive vehicle removable roof system includes a plurality of locks 116, such as those shown in FIG. 6. The locks 116 are configured to interact to secure the removable panels 104, 104', 104", 104''', 104'''', 104''''' to the fixed vehicle structure 102. According to embodiments, each of the plurality of locks 116 is a 2-way locating pin positioned on one of the fixed vehicle frame 102 and one of the removable panels 104, 104', 104", 104''', 104'''', 104''''' for interlocking with a locating receptacle positioned on the opposite of the fixed vehicle frame 102 or one of the removable panels 104, 104', 104", 104''', 104'''', 104'''''. The locks 116 ensure that removable panels 104, 104', 104", 104''', 104'''', 104''''' are configured for installation to and removal from the fixed vehicle structure 102 without the use of tools.

Figure 2:
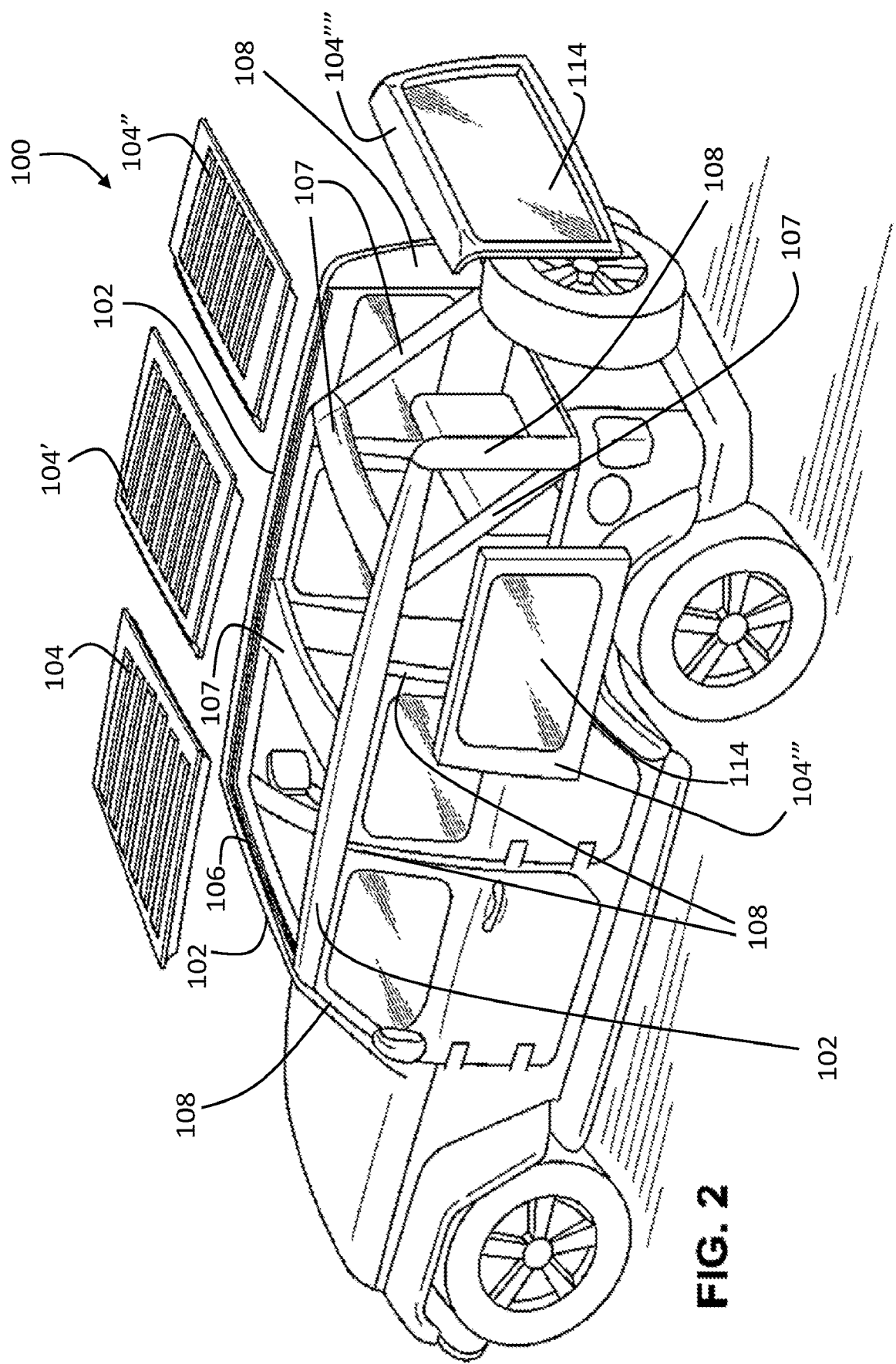
FIG. 2 is an exploded perspective view of the vehicle removable roof system of FIG. 1.
Figure 3:
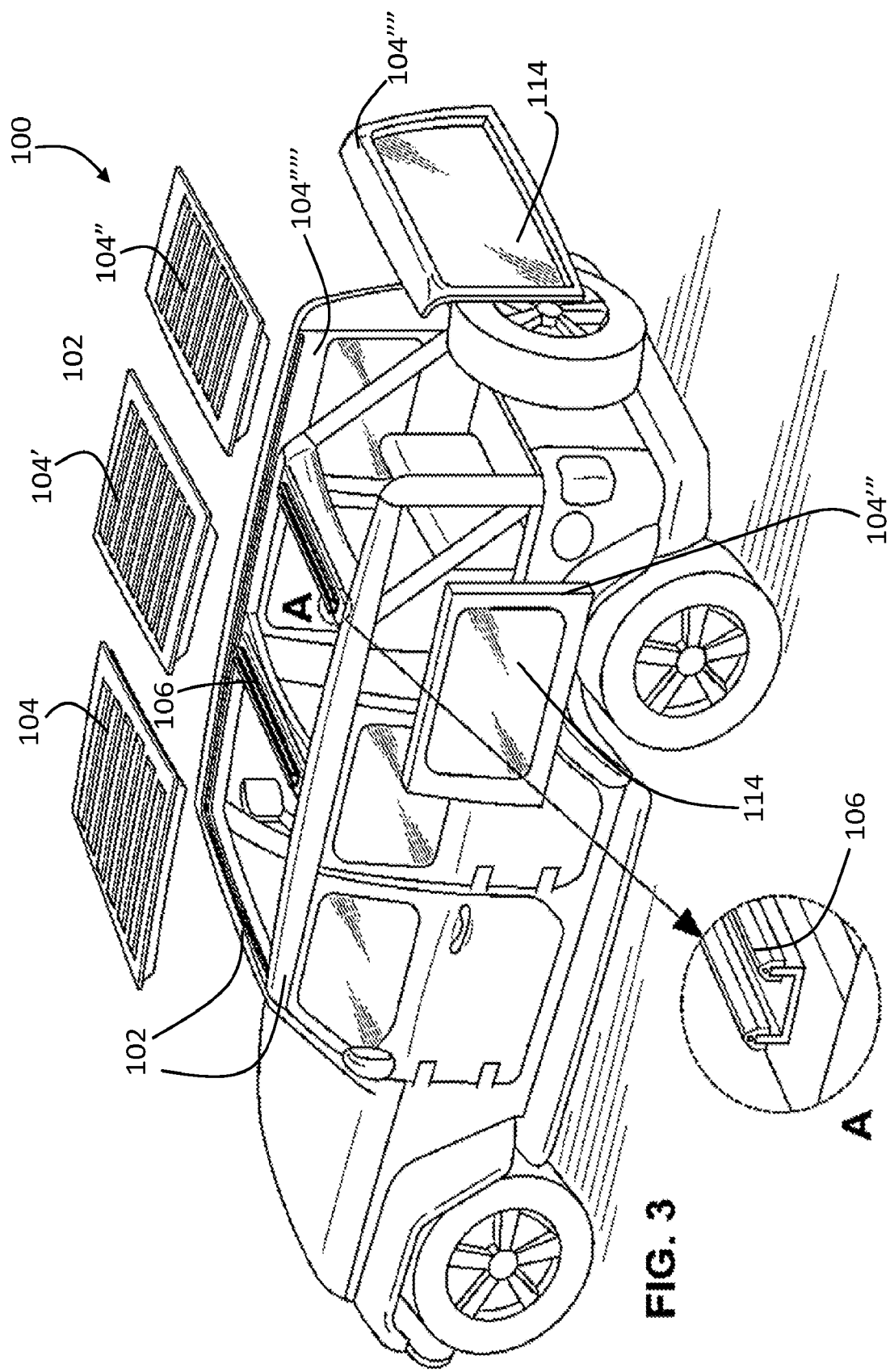
FIG. 3 is an exploded perspective view of the vehicle removable roof system of FIG. 1.

The water management system 106 of the present invention is best shown in FIGS. 2 and 3. According to embodiments of the present invention, the water management system 106 comprises a weather strip or sealable gasket. The weather strip or sealable gasket is compressed between the removable panels 104, 104', 104", 104''', 104'''', 104''''' and the fixed vehicle structure 102 when the removable panels 104, 104', 104", 104''', 104'''', 104''''' are installed in the fixed vehicle structure 102, thereby forming a water tight seal. According to embodiments, the water management system 106 is attached to each of the removable panels 104, 104', 104'', 104''', 104'''', 104''''', while according to further embodiments, the water management system 106 is attached to the fixed vehicle structure 102, as shown in FIGS. 2 and 3. According to embodiments, such as shown in FIG. 9, flanges 103 of the panels 104, 104', 104'', 104''', 104'''', 104''''' extend over and engage with the water management system 106. Further details regarding the water management system 106 are described in U.S. Pat. No. 9,180,762 filed Jun. 18, 2014, the contents of which are hereby incorporated by reference.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient roadmap for implementing the exemplary embodiment or exemplary embodiments. It should be understood that various changes may be made in the function and arrangement of elements without departing from the scope as set forth in the appended claims and the legal equivalents thereof.

The invention claimed is:

1. A vehicle removable roof system comprising:
a fixed vehicle structure;
at least two removable panels;
wherein each of the removable panels has a first flange extending from a first end and a second flange extending from a second end, the first flange and the second flange both configured to engage with the fixed vehicle structure and
wherein each of the removable panels has a third flange extending from one of a front edge or a back edge of the removable panel, the third flange of a first of the two removable panels configured to nest with the third flange of a second of the two removable panels; and
a water management system positioned directly between the one or more removable panels and the fixed vehicle structure, the water management system comprising a weather strip or sealable gasket that spans a length of at least the first flange and the second flange of each of the removable panels from the front edge to the back edge of each of the removable panels, the weather strip or sealable gasket configured to be compressed between the removable panels and the fixed vehicle frame when the removable panels are installed in the fixed vehicle frame.

2. The vehicle removable roof system of claim 1 wherein the fixed vehicle structure includes roll bars of the vehicle.

3. The vehicle removable roof system of claim 1 wherein the at least two removable panels are formed of a composite sandwich panel assembly.

4. The vehicle removable roof system of claim 3, wherein the composite sandwich panel assembly comprises an open area core defining a plurality of pores, a high gloss surface sheet adhered to a first face of said open area core by a first adhesive layer, and a structural skin adhered to a second side of said open area core by a second adhesive layer.

5. The vehicle removable roof system of claim 1 wherein at least one of the removable panels includes corrugations.

6. The vehicle removable roof system of claim 1 wherein at least one of the removable panels includes a transparent portion.

7. The vehicle removable roof system of claim 6 wherein the transparent portion is formed of glass or clear polycarbonate.

8. The vehicle removable roof system of claim 1 wherein the removable panels are substantially planar.

9. The vehicle removable roof system of claim 1 wherein the removable panels are configured to be positioned within the fixed vehicle structure.

10. The vehicle removable roof system of claim 9 wherein the first and second flanges are configured to extend over the fixed vehicle structure to engage therewith.

11. The vehicle removable roof system of claim 1 wherein the removable panels are configured for installation to and removal from the fixed vehicle structure by a single user.

12. The vehicle removable roof system of claim 1 wherein the removable panels are configured for installation to and removal from the fixed vehicle structure without the use of tools.

13. The vehicle removable roof system of claim 1 wherein the removable panels are interchangeable.

14. The removable roof system of claim 1 further comprising a plurality of locks that are configured to interact to secure the removable panels to the fixed vehicle structure.

15. The vehicle removable roof system of claim 1 wherein the water management system is attached to the fixed vehicle structure.

* * * * *